United States Patent [19]

Christensen et al.

[11] 4,055,467
[45] Oct. 25, 1977

[54] ENZYMATIC DISPERSION OF BIOLOGICAL SLIMES

[75] Inventors: Ronald J. Christensen, Westmont; George J. Zivtins, Schauburg, both of Ill.

[73] Assignee: Nalco Chemical Company, Oak Brook, Ill.

[21] Appl. No.: 752,226

[22] Filed: Dec. 20, 1976

[51] Int. Cl.² .......................... C12B 1/00; D21F 1/66
[52] U.S. Cl. ........................................ 195/2; 195/4; 162/161; 162/190
[58] Field of Search ............... 195/2, 4; 162/190, 161; 210/64

[56] References Cited

U.S. PATENT DOCUMENTS 3,773,623 11/1973 Hatcher et al. ...................... 195/60

OTHER PUBLICATIONS

Rohm and Haas Company, Special Products Department, SP-258 j/e, "Rhozyme HP-150".
Abstract Bulletin Institute Paper Chemistry (A.B.I.P.C.), vol. 45, Feb. 1975, 7293.

*Primary Examiner*—Lionel M. Shapiro
*Attorney, Agent, or Firm*—John G. Premo; Robert A. Miller; Barry W. Sufrin

[57] ABSTRACT

Slime in industrial process waters can be dispersed and prevented by treating the waters with a few ppm of the enzyme, Rhozyme HP-150, a pentosanase-hexosanase.

2 Claims, No Drawings

ENZYMATIC DISPERSION OF BIOLOGICAL SLIMES

INTRODUCTION

Industrial process waters such as are used in industrial cooling towers and paper mill systems often contain large quantities of slime which, if uncontrolled, form undesirable deposits on the surfaces in contact with these waters. In the case of industrial cooling towers, slimes can deposit on heat transfer surfaces and substantially reduce heat transfer efficiency. In paper mills, slime formation can interfere with sheet production and cause undesirable inclusions in finished paper products.

A common method of preventing these slimes which are primarily of biological origin has been to treat the aqueous systems wherein these slimes are formed with biocides. It has been found, however, that biocides are not entirely effective. In other instances, biocides are too toxic to be used where there is a chance they might come in contact with human beings or would contaminate products such as food grade paper products.

A recently proposed method for controlling slime formation in paper mills have been the treatment of paper mill waters with the enzyme, levan hydrolase. This approach to slime control is found in U.S. Pat. No. 3,773,623.

THE INVENTION

In accordance with the invention, it has been found that biological slimes associated with industrial process waters may be dispersed and prevented from depositing on solid surfaces in contact with such waters by treating such waters with at least 3 ppm of the enzyme, Rhozyme HP-150, a pentosanase-hexosanase. As is well known to those skilled in the art, the biological slimes include bacterial, fungal and algal slimes. The invention is particularly effective in treating industrial waters used in the operation of cooling towers to disperse slimes and slime-forming masses within such waters to prevent the deposit of such slimes on the heat exchange surfaces of cooling towers and other surfaces associated with such units.

In a preferred embodiment of the invention, Rhozyme HP-150*, a pentosanase-hexosanase, is employed at a dosage rate varying between 5 - 100 ppm.
*Rhozyme is a trademark of Rohm and Haas Co., Philadelphia, Pa.

To determine the efficiency of various materials to disperse existing biologically produced slimes, a laboratory scale forced draft single cell cooling tower used. The basic characteristic of this cooling tower and the environment are set forth below:

| | |
|---|---|
| Process Cooled: | Experimental Heat Exchanger Tubes |
| Total Capacity: | 20 liters |
| Recirculation Rate: | 2 Gallons per minute |
| Blowdown Rate: | 70 C.C. per minute |
| Make-up Water: | Chicago Tap Water |
| ΔT: | 4° C. |
| Concentration: | 3 |
| pH Tower Water: | 8.5 |
| Hardness: | 435 ppm (as calcium carbonate) |
| Temperature: | 100° F. |
| Make-up Water: | 12 gallons per 24 hours |

To the tower makeup water was added 50 ppm each of ethylene glycol and a source of organic phosphorus in the form of a phosphate ester. The tower was allowed to run without biological control for 4 days, which caused the substantial formation of slime masses on the metallic heat exchange surfaces.

10 ppm of the particular chemical to be tested was added to the water of the tower and allowed to circulate for 1 hour. At the end of that period of time, a bio mass assay was made of the basin water using a duPont biometer, which is described in the duPont publication entitled, *duPont 760 Luminescence Biometer,* December, 1970. It is also described in U.S. Pat. No. 3,359,973.

The results of these tests are set forth in Table I.

TABLE I

Enzyme Biodispersancy - 10 ppm/1 Hour Contact Biometer Data

| Enzyme | % Biomass Change |
|---|---|
| 1. Lysozyme | 65.3% |
| 2. Rhozyme HP-150* | 64.8% |
| 3. Amylase | 26.8% |

*Rhozyme HP-150 was the only enzyme tested not contributing significant microbiological population with inoculum.

Having thus described our invention, it is claimed as follows:

1. A method for preventing slimes from being deposited on solid surfaces in contact with industrial process waters which comprises treating these waters with at least 3 ppm of the enzyme, Rhozyme HP-150, a pentosanase-hexosanase.

2. The method of claim 1 where the industrial process water is a cooling tower water.